US012623332B2

(12) United States Patent
Patterson et al.

(10) Patent No.: US 12,623,332 B2
(45) Date of Patent: May 12, 2026

(54) ERGONOMIC HOUSING FOR A POWER TOOL

(71) Applicant: Snap-on Incorporated, Kenosha, WI (US)

(72) Inventors: Matthew D. Patterson, Knoxville, TN (US); William Berry Dance, Murphy, NC (US)

(73) Assignee: Snap-on Incorporated, Kenosha, WI (US)

( * ) Notice: Subject to any disclaimer, the term of this patent is extended or adjusted under 35 U.S.C. 154(b) by 176 days.

(21) Appl. No.: 17/348,050

(22) Filed: Jun. 15, 2021

(65) Prior Publication Data

US 2022/0009072 A1     Jan. 13, 2022

Related U.S. Application Data

(60) Provisional application No. 63/049,800, filed on Jul. 9, 2020.

(51) Int. Cl.
B25F 5/02          (2006.01)
B23B 45/00          (2006.01)

(52) U.S. Cl.
CPC .............. B25F 5/02 (2013.01); B23B 45/001 (2013.01)

(58) Field of Classification Search
None
See application file for complete search history.

(56) References Cited

U.S. PATENT DOCUMENTS

| | | | |
|---|---|---|---|
| 896,099 | A | 8/1908 | Gardner |
| 3,019,673 | A | 2/1962 | Sjostrand et al. |
| 4,109,559 | A | 8/1978 | Davis |
| 5,451,127 | A | 9/1995 | Chung |
| 5,560,133 | A | 10/1996 | Kuebler |
| 6,129,740 | A | 10/2000 | Michelson |
| 6,609,322 | B1 | 8/2003 | Michelson |
| 6,688,407 | B2 | 2/2004 | Etter et al. |
| 7,014,638 | B2 | 3/2006 | Michelson |
| 7,143,841 | B2 | 12/2006 | Etter et al. |
| 8,261,852 | B2 | 9/2012 | Miyazawa et al. |
| 8,261,853 | B2 | 9/2012 | Hachisuka |
| 8,267,192 | B2 | 9/2012 | Lopano |

(Continued)

FOREIGN PATENT DOCUMENTS

| | | | |
|---|---|---|---|
| CN | 1811203 | A | 8/2006 |
| CN | 1895825 | A | 1/2007 |

(Continued)

OTHER PUBLICATIONS

United Kingdom Combined Search and Examination Report for corresponding UK Application No. GB2109580.7, dated Dec. 20, 2021, 7 pages.

(Continued)

*Primary Examiner* — Daniel Jeremy Leeds
(74) *Attorney, Agent, or Firm* — Taft, Stettinius & Hollister LLP

(57)          ABSTRACT
A tool having a housing with a motor housing portion having a motor disposed therein. A groove is formed in the motor housing portion and is disposed proximate an output axis of the tool. The groove is adapted to receive an index finger of a user, and a trigger adapted to operate the motor is adapted to be operated by a middle finger of the user.

19 Claims, 7 Drawing Sheets

(56)          References Cited

U.S. PATENT DOCUMENTS

| 8,657,029 | B2 | 2/2014 | Miyazawa et al. |
| 9,505,120 | B2 | 11/2016 | Aoki et al. |
| 9,550,290 | B2 | 1/2017 | Miyazawa et al. |
| 2003/0146008 | A1 | 8/2003 | Andriolo |
| 2004/0226174 | A1 | 11/2004 | Etter et al. |
| 2005/0028997 | A1 | 2/2005 | Hagan |
| 2007/0125565 | A1 | 6/2007 | Etter et al. |
| 2010/0252293 | A1 | 10/2010 | Lopano et al. |
| 2011/0188232 | A1 | 8/2011 | Friedman et al. |
| 2014/0014385 | A1 | 1/2014 | Kosugi et al. |
| 2014/0318822 | A1 | 10/2014 | Ullrich et al. |
| 2015/0151424 | A1* | 6/2015 | Elder .................. B25F 5/02 173/170 |
| 2015/0290791 | A1* | 10/2015 | Takahashi .......... B25F 5/02 173/170 |
| 2017/0157760 | A1 | 6/2017 | McAuliffe et al. |
| 2018/0257213 | A1 | 9/2018 | Elder et al. |
| 2019/0314973 | A1 | 10/2019 | Lopano et al. |
| 2021/0229257 | A1* | 7/2021 | Hiller ............ B23B 45/008 |
| 2022/0219309 | A1 | 7/2022 | Billings et al. |

FOREIGN PATENT DOCUMENTS

| CN | 101733741 | A | 6/2010 |
| CN | 103223655 | A | 7/2013 |
| CN | 102639301 | B | 12/2016 |
| CN | 109848926 | | 6/2019 |
| DE | 2426111 | | 12/1975 |
| DE | 7905217 | | 5/1979 |
| EP | 0142650 | | 5/1985 |
| EP | 0790697 | A1 | 8/1997 |
| EP | 3059051 | A1 | 8/2016 |
| JP | 1234176 | | 9/1989 |
| JP | 8266956 | | 10/1996 |
| JP | 2001198856 | | 7/2001 |
| JP | 2005153049 | | 6/2005 |
| JP | 2006123086 | A | 5/2006 |
| JP | 2008044024 | | 2/2008 |
| JP | 2008284617 | A | 11/2008 |
| JP | 4525298 | | 8/2010 |
| JP | 4983168 | | 7/2012 |
| JP | 2014028412 | | 2/2014 |
| JP | 2019025105 | | 2/2019 |
| KR | 200476199 | | 2/2015 |
| TW | 302800 | U | 4/1997 |
| TW | 383270 | B | 3/2000 |
| TW | 577789 | B | 3/2004 |
| TW | 263551 | B | 10/2006 |
| TW | M481796 | U | 7/2014 |
| WO | 2002064270 | | 8/2002 |
| WO | 2008140086 | A1 | 11/2008 |

OTHER PUBLICATIONS

Examination Report No. 1 for corresponding Application No. 2021204599 dated Mar. 9, 2022, 3 pages.
Taiwan Office Action for corresponding Application No. 11120375590 dated Apr. 20, 2022, 10 pages.
United Kingdom Examination Report for corresponding Application No. GB2109580.7, dated Aug. 25, 2022, 4 pages.
Examination Report No. 3 for corresponding Application No. 2021204599 dated Jan. 3, 2023, 3 pages.
Examination Report for corresponding Application No. GB2109580.7 dated Jan. 5, 2023, 7 pages.
United Kingdom Examination Report for corresponding UK Application No. GB2109580.7, dated May 25, 2023, 7 pages.
Examination Report for corresponding Application No. GB2109580.7 dated Sep. 5, 2023, 8 pages.
United Kingdom Examination Report for corresponding UK Application No. GB2109580.7, dated Feb. 13, 2024, 5 pages.
Chinese Office Action for corresponding CN Application No. 202110773356.9, dated Jan. 18, 2024, 11 pages.
Australian Patent Office, Examination Report No. 1 issued in corresponding Application No. 2023203953, dated Jun. 29, 2024, 5 pp.
UK Intellectual Property Office, Pre-Hearing Report issued in corresponding Application No. GB2109580.7, dated Jul. 31, 2024, 2 pp.
Chinese Patent Office, Second Office Action issued in corresponding Application No. 202110773356.9, dated Jun. 12, 2024, 9 pp.
UK Intellectual Property Office, Examination Report issued in corresponding Application No. GB2413584.0, dated Oct. 9, 2024, 6 pp.

* cited by examiner

ERGONOMIC HOUSING FOR A POWER TOOL

CROSS REFERENCES TO RELATED APPLICATIONS

This application claims priority to, and the benefit of, U.S. Provisional Patent Application Ser. No. 63/049,800, filed Jul. 9, 2020, the contents of which are incorporated herein by reference in their entirety.

TECHNICAL FIELD OF THE INVENTION

The present invention relates to a housing of a power tool.

BACKGROUND OF THE INVENTION

Many tools are powered by electric power, via an external power source (such as a wall outlet) or a battery. Drills and impact wrenches, for example, impart torque to a work piece to loosen or tighten the work piece. However, existing tools can be bulky due to the motor and other internal components of the tool. This size can cause problems when trying to access work pieces that are located in tight or hard to reach places.

For example, current tools are designed such that a trigger used to operate an output of the tool is actuated by an index finger of a user. This causes the user to hold the tool away from the axis of the output and the weight of the motor. Accordingly, the user often must use two hands to maintain adequate control of the tool for precision operation. This can cause problems when trying to access work pieces that are located in tight or hard to reach places that will not permit two handed operation.

SUMMARY OF THE INVENTION

The present invention relates broadly to a housing for a power tool, such as a drill, router, grinder, impact wrench, ratchet wrench, screwdriver, or other powered tool, that is powered by electricity via an external power source (such as a wall outlet and/or generator outlet) or a rechargeable power source, such as a battery. The housing allows the tool to be held closer to the axis of the output and center of weight of the motor. For example, the housing allows a user to comfortably operate the trigger of the tool with a middle finger and position an index finger of the user in a groove that is proximate the axis of the output and the weight of the motor for better control and/or stability. This position/location of the hand of the user provides ergonomic advantage during precision operation.

The present invention broadly includes a tool. The tool includes a housing having a motor housing portion and a handle housing portion, a motor disposed in the motor housing portion and adapted to selectively rotate a motor shaft in either of first and second rotational directions, and a groove formed in the motor housing portion.

BRIEF DESCRIPTION OF THE DRAWINGS

For the purpose of facilitating an understanding of the subject matter sought to be protected, there is illustrated in the accompanying drawing embodiments thereof, from an inspection of which, when considered in connection with the following description, the subject matter sought to be protected, its construction and operation, and many of its advantages, should be readily understood and appreciated.

DETAILED DESCRIPTION

Figure 1:
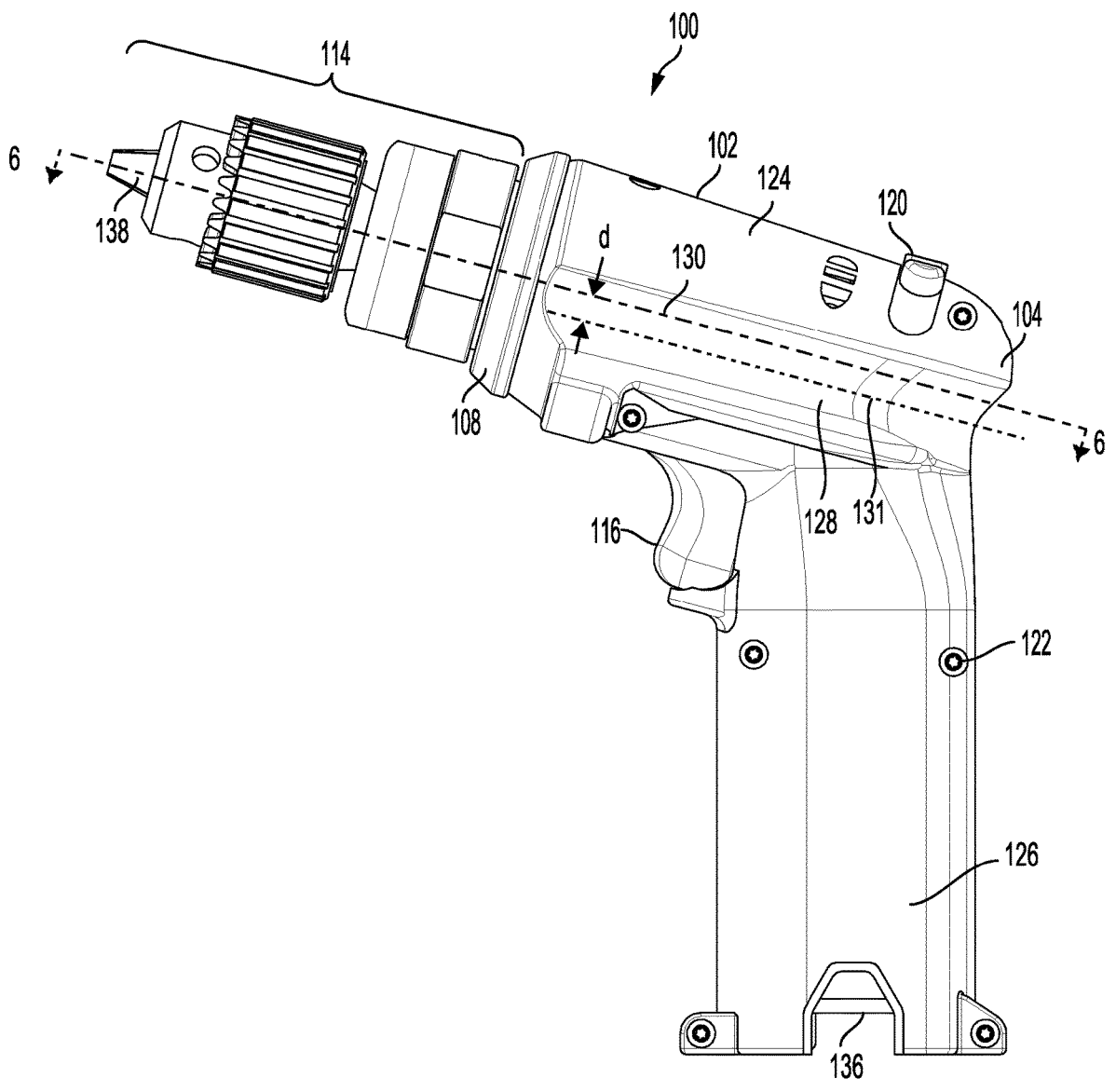
FIG. 1 is a side view of a tool according to an embodiment of the present invention.
Figure 2:
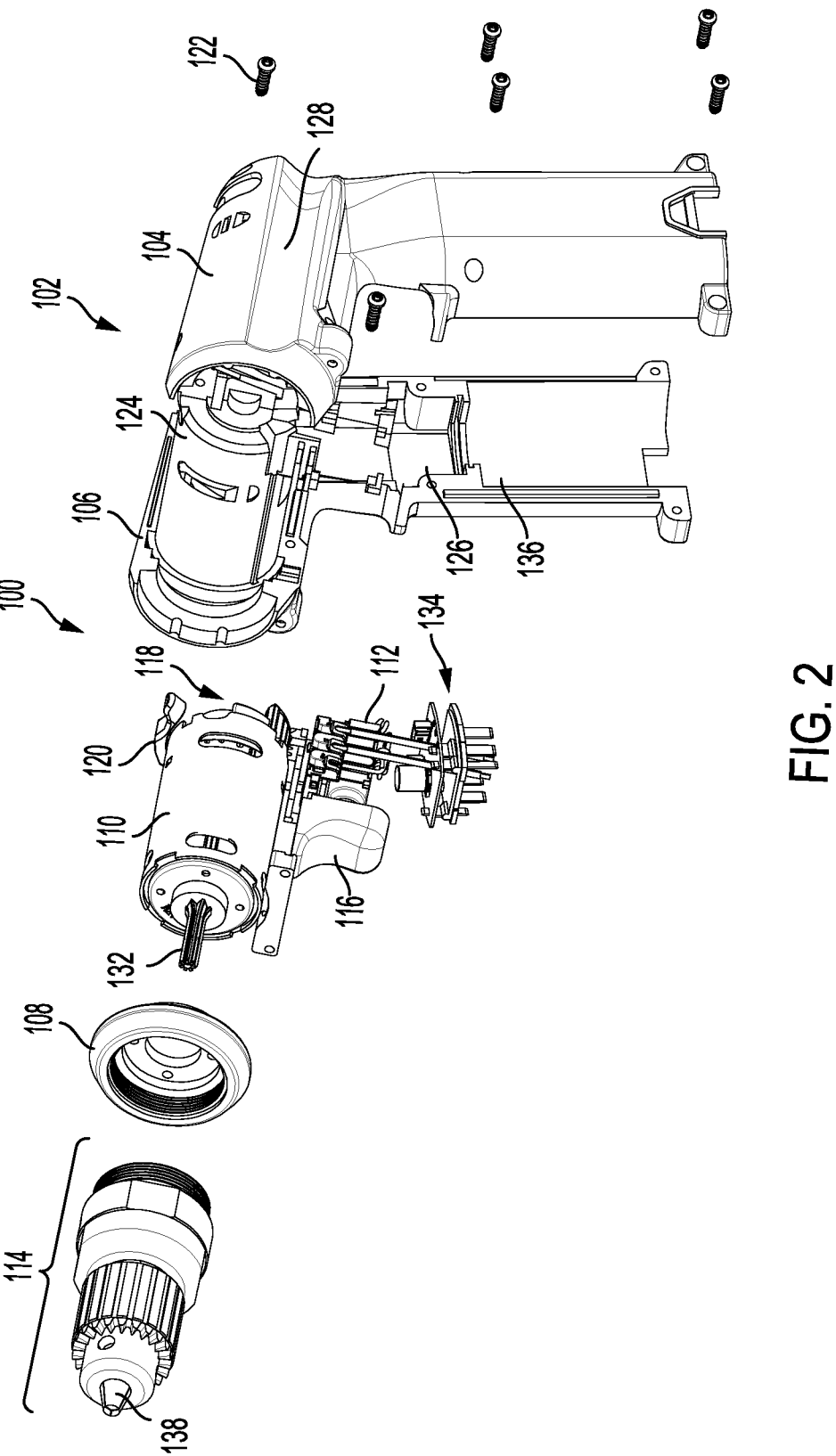
FIG. 2 is a perspective exploded view of the tool of FIG. 1.
Figure 3:
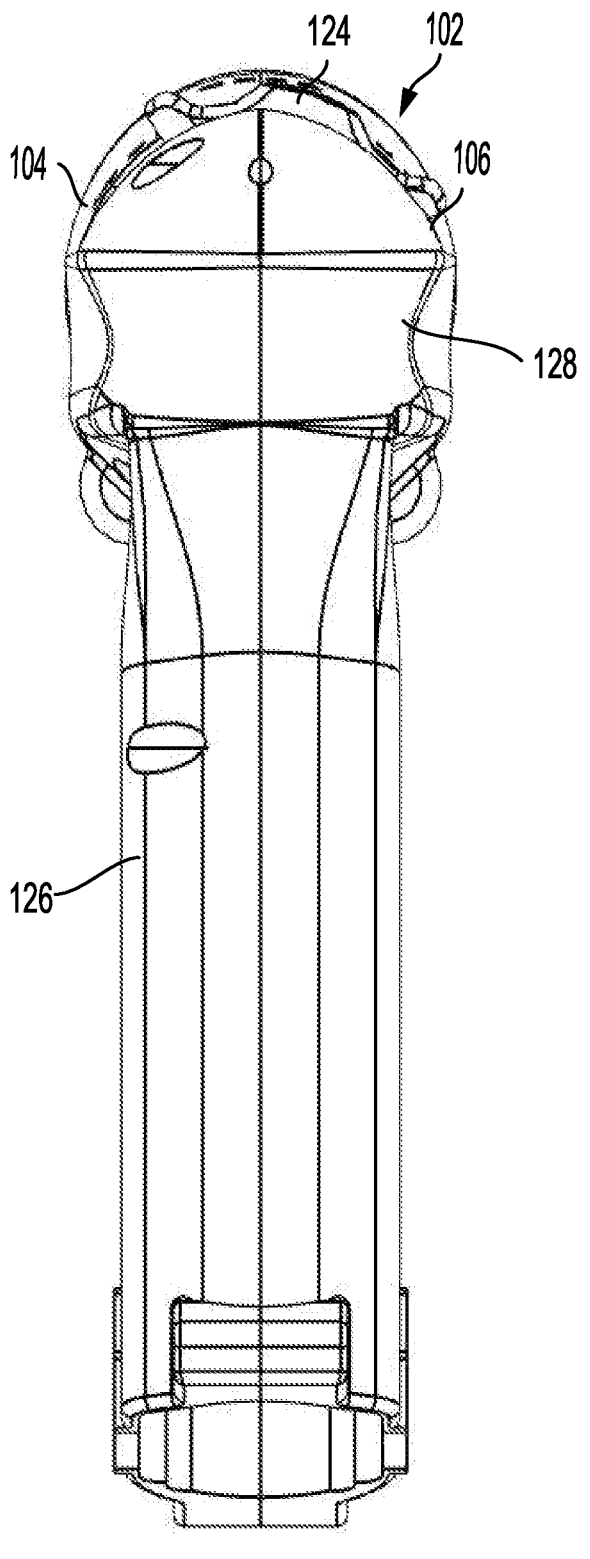
FIG. 3 is a rear view of the tool of FIG. 1.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention relates broadly to a housing for a power tool, such as a drill, router, grinder, impact wrench, ratchet wrench, screwdriver, or other powered tool, that is powered by electricity via an external power source (such as a wall outlet and/or generator outlet) or a rechargeable battery source, such as a battery, and includes a motor and motor shaft. The housing includes a groove adapted to receive an index finger of a user that moves the position/location of a hand of the user closer to the axis of the output and the weight of the motor (compared to previous tools).

For example, the trigger of the tool is adapted to be operated by a middle finger of a user to cause rotation of the output of the tool in either of first and second directions (e.g. clockwise and counter-clockwise) and the index finger of the user is proximate the axis of the output and the weight of the motor for better control and/or stability of the tool during use. This position/location provides ergonomic advantage during precision, single-handed operation by allowing the user to hold the tool closer to the axis of the output and the weight of the motor, in either hand ambidextrously, and also places the trigger actuation higher on the tool, closer to the axis of output of the tool.

Referring to FIGS. 1-7, a tool 100 includes a housing 102 having first and second housing portions 104 and 106, a housing clamp 108 adapted to couple the first and second housing portions 104 and 106 together, a motor 110, and a switch mechanism 112 disposed in the housing 102, an output nose mechanism 114 coupled to the housing clamp 108 at a working end of the tool 100, a trigger 116, and a direction selector mechanism 118 with a direction selector (also referred to as an actuator or toggle) 120.

In an embodiment, the housing 102 is a clamshell-type housing with first and second housing portions 104 and 106 that are coupled together via the housing clamp 108 at a forward end or working end of the housing 102 and one or more fasteners 122 in a handle area of the housing 102. Alternatively, the first and second housing portions 104 and 106 are coupled together via fasteners (not shown) in a conventional manner.

The housing 102 includes a motor housing portion 124 and a handle housing portion 126. In an embodiment, the motor housing portion 124 and handle housing portion 126 are disposed at an angle with respect to each other. For example, a longitudinal axis of the motor housing portion 124 and a longitudinal axis of the handle housing portion 126 are disposed at an angle of about 100 to about 120 degrees, and more particularly about 110 degrees with respect to each other.

Figure 4:
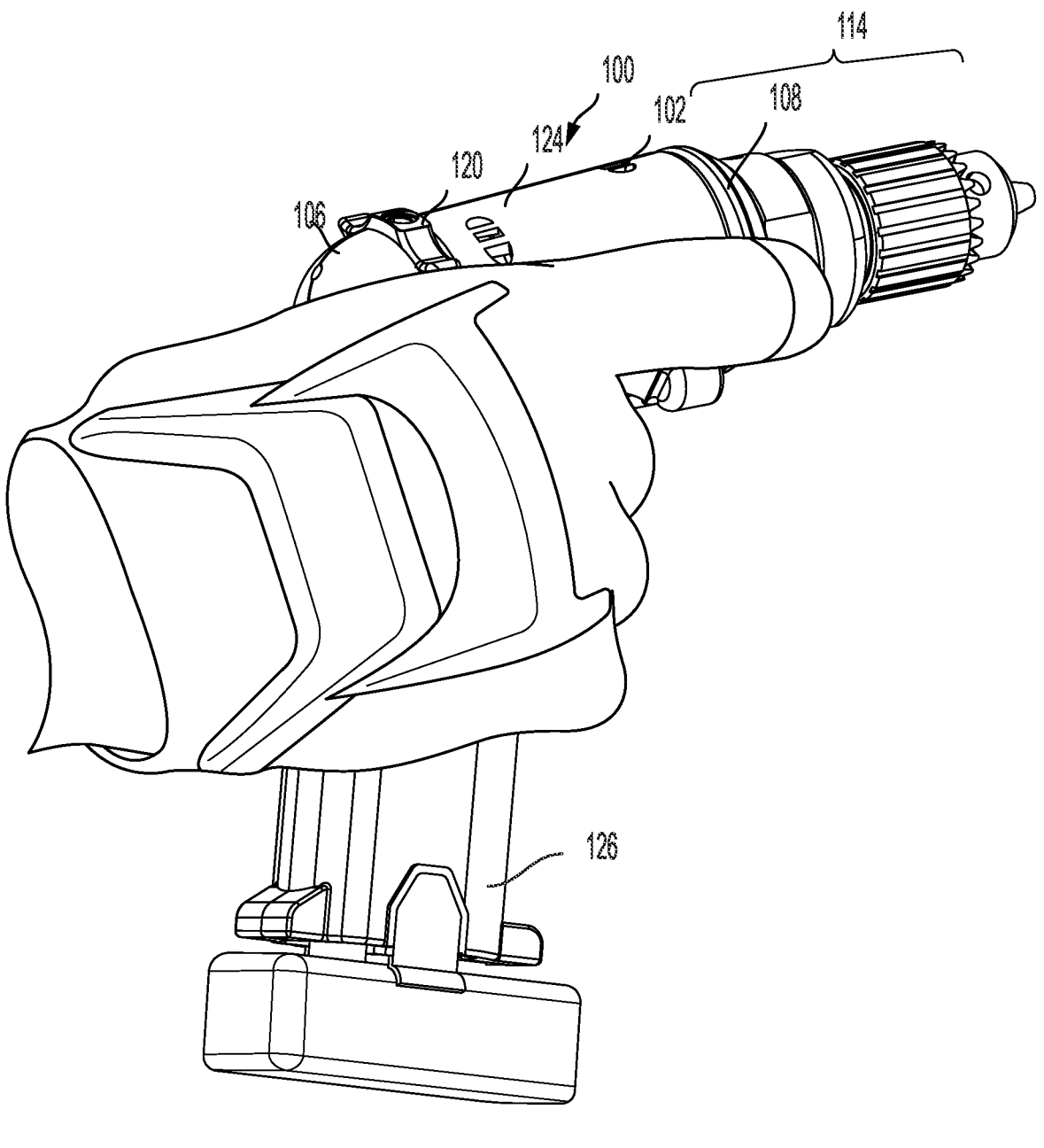
FIG. 4 shows the tool of FIG. 1 being operated by a user.
Figure 7:
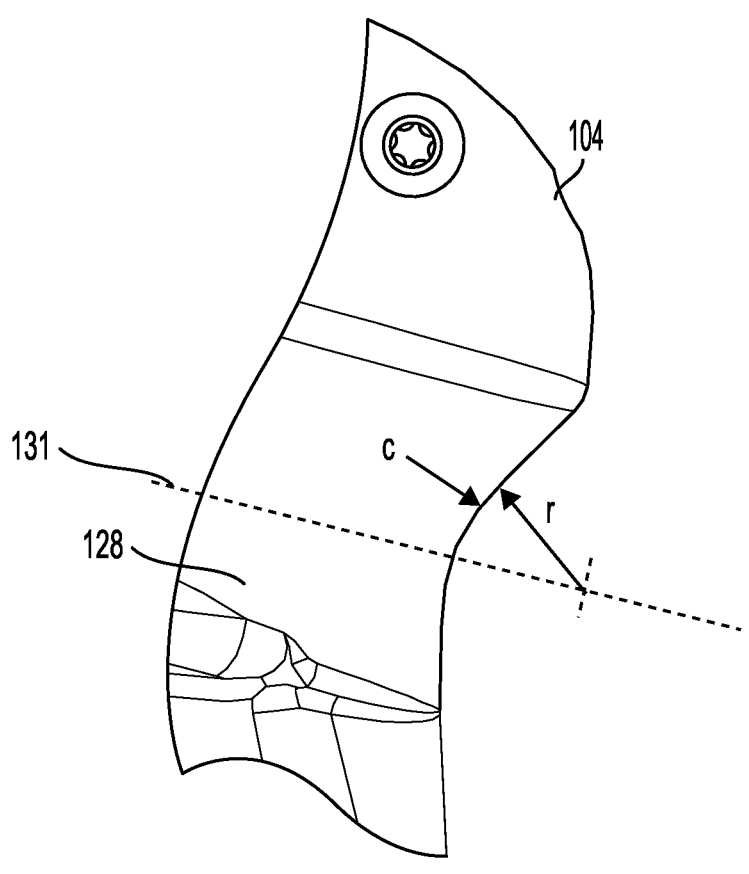
FIG. 7 is a plan, detail view of the groove formed in the tool of FIG. 1.

The motor housing portion 124 includes a groove 128 formed therein and adapted to receive an index finger of a user of the tool. The groove 128 is disposed proximate to an output axis 130 of the tool 100. In an embodiment, the groove 128 extends from proximate the housing clamp 108 to a rear of the housing 102, which is opposite a forward end or working end of the housing 102, and is substantially parallel to the output axis 130 of the tool 100. The groove 128 is formed on both the first and second housing portions 104 and 106. As illustrated in FIG. 4, the groove 128 allows for comfortable operation of the trigger 116 by a middle finger of the user, thereby positioning a hand of the user closer to the weight of the motor 110 and the output axis 130 of the tool 100. In an embodiment, the centerline 131 of the groove 128 is offset by distance d from the output axis 130 of the tool 100 in a range of about 0.125 to 0.5 inches, and more specifically about 0.25 inches. Preferably, as illustrated in FIG. 7, at least a portion of the groove 128 on the back portion of the tool 100 adapted to receive the web between the thumb and index finger of the user has a curvature, c, in a range of about 1.5 to 1.625 inches, and more specifically about 1.52 inches, and a radius, r, in a range of about 0.625 to 0.75 inches, and more specifically about 0.657 inches. This position/location of the hand and index finger provides ergonomic advantage during precision operation.

Figure 5:
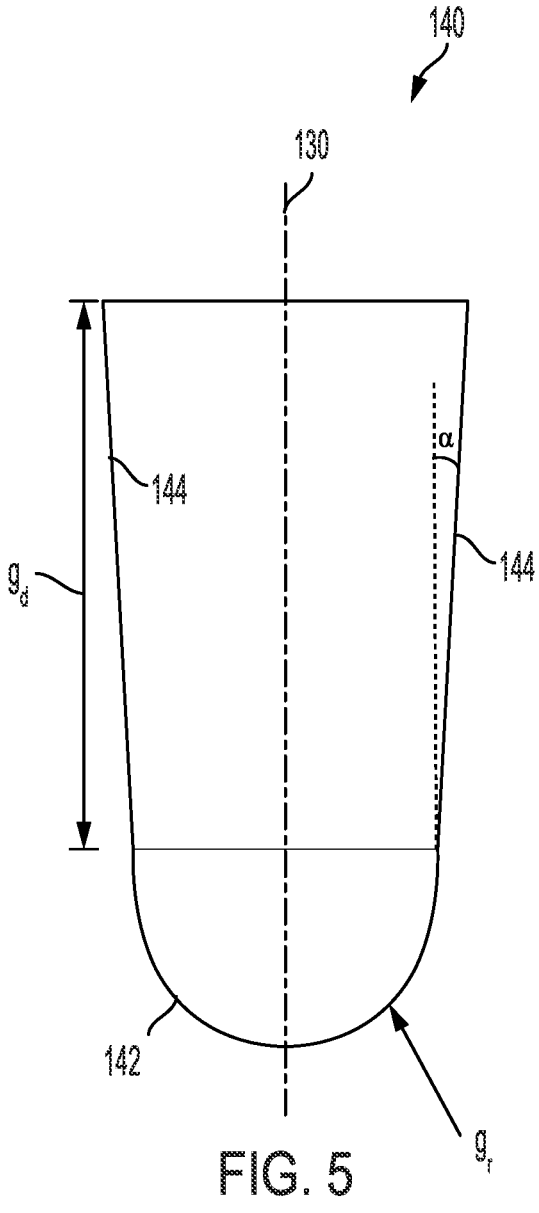
FIG. 5 shows a groove path of a groove formed in the tool of FIG. 1.
Figure 6:
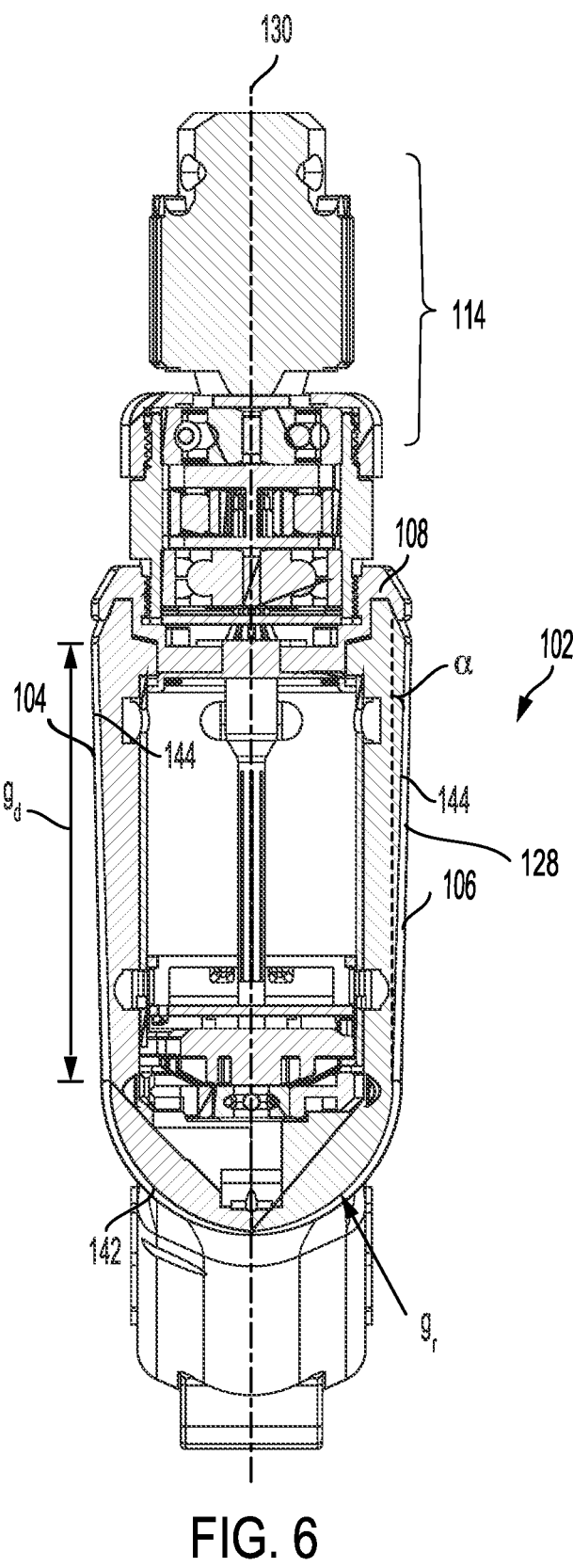
FIG. 6 is a section view of the tool of FIG. 1 taken along line 6-6 of FIG. 1.

As illustrated in FIGS. 5 and 6, the groove 128 follows a groove path 140. The groove path 140 has a curved portion 142 and substantially straight portions 144. The curved portion 142 is disposed on the back portion of the tool 100 and is adapted to receive the web between the thumb and index finger of the user. In an embodiment, the substantially straight portions 144 respectively extend from the curved portion 142 at an angle $\alpha$ of about 3° for a distance $g_d$ of about 3 inches. In an embodiment the curved portion 142 has a radius $g_r$ between a range of about 0.8125 to 0.875 inches, and more specifically about 0.825 inches.

The motor 110 is disposed in the motor housing portion 124, and includes a motor output shaft 132 extending from a working end of the motor 110. The switch mechanism 112 is disposed in the handle housing portion 126, and is operably coupled to the motor 110. The trigger 116 is disposed substantially at an intersection of the handle and motor housing portions 126 and 124, and is operably coupled to the switch mechanism 112. Actuation of the trigger 116 (such as depression of the trigger 116) causes the motor 110 to operate, thus causing the motor shaft 132 to rotate in either one of first and second rotational directions. The trigger 116 may also be biased such that the trigger 116 is depressible inwardly, relative to the tool 100, to cause the tool 100 to operate, and release of the trigger 116 causes the trigger 110 to move outwardly, relative to the tool 100, to cease operation of the tool 100 via the biased nature of the trigger 116.

The motor 110 may be a brushless or brushed type motor, or any other suitable motor. The trigger 116 and switch mechanism 112 may also be a variable speed type mechanism. In this regard, actuation or depression of the trigger 116 causes the motor 104 to rotate the motor shaft 132 at a faster speed the further the trigger 116 is depressed. For example, a small or slight depression of the trigger 116 causes the motor 110 to rotate the motor shaft 132 at a first speed (e.g. a slow speed), full depression of the trigger 116 causes the motor 110 to rotate the motor shaft 132 at a second speed (e.g. a fast speed), and a medium depression of the trigger 116 causes the motor 110 to rotate the motor shaft 132 at a third speed (e.g. a speed faster than the first speed and slower than the second speed).

The switch mechanism 112 may also be coupled to a controller 134 (which may include a printed circuit board) including battery contacts that couple to corresponding electrical contacts on a removable battery. In this regard, the handle housing portion 126 may include a battery opening 136 adapted to receive and couple to the removable battery. While, the tool 100 is described as being powered by a battery, the tool 100 may be power by other electrical power sources, such as an external wall outlet, etc., or other power sources, such as a fuel cell.

The output nose mechanism 114 is adapted to couple to the working end of the housing 102 of the tool 100, and may include a chuck 138 adapted to receive a variety of tool bits (including, driver bits, drill bits, cutting bits, socket bits, grinding bits, etc.). The output nose mechanism 114 may couple to the housing clamp 108, and receive and engage the shaft 132 of the motor 110. For example, the output nose mechanism 114 may include a gear or transmission mechanism that couples to the shaft 132 of the motor 110, and transfers rotation of the shaft 132 to the chuck 138. Thus, rotation of the shaft 132 of the motor 110 causes rotation of the chuck 138.

The direction selector mechanism 118 includes the direction selector 120. The direction selector 120 is adapted to be moved between first and second positions (for example, by a thumb of a user) to allow the user to select the desired rotation direction of the motor 110. For example, movement of the direction selector 120 to the first position causes selection of the first rotational direction, and movement of the direction selector 120 to the second position causes selection of the second rotational direction.

While the tool 100 is described above as having an output nose mechanism 114 with a drill chuck 138, the tool 100 may have different types of output nose mechanisms. For example, the tool 100 may include a output nose mechanism that includes a router type output or an impact type output with a drive lug. The impact type output may deliver high torque output by storing energy in a rotating mass, then delivering it in impacting forces to the output shaft of the drive lug. The drive lug can be coupled to other devices, such as a socket or other adapter, to apply torque to a work piece, such as, for example, a screw or bolt, in a well-known manner.

As discussed herein, the tool 100 is a drill, router, or impact wrench. However, the tool 100 can be any electrically powered or hand-held tool, including, without limitation, a ratchet wrench, screwdriver, or other powered tool, that is powered by electricity via an external power source (such as a wall outlet and/or generator outlet) or a battery.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object. As used herein, the term "a" or "one" may include one or more items unless specifically stated otherwise.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A tool having an output longitudinal axis and adapted to be used by a user having an index finger, the tool comprising:

a housing having a motor housing portion and a handle housing portion;

a motor disposed in the motor housing portion, wherein the motor is adapted to rotate a motor shaft of the motor; and a groove formed in the motor housing portion and adapted to receive the index finger of the user, wherein the groove has a centerline that is substantially parallel to the output longitudinal axis and offset from the output longitudinal axis in a direction towards the handle housing portion.

2. The tool of claim 1, wherein the groove is disposed proximate to the output longitudinal axis.

3. The tool of claim 1 further comprising a trigger adapted to operate the motor, and the trigger is adapted to be operated by a middle finger of the user.

4. The tool of claim 1, wherein the housing is a clamshell-type housing with first and second housing portions that are coupled together.

5. The tool of claim 4, wherein the first and second housing portions are coupled together via a housing clamp.

6. The tool of claim 4, wherein the groove includes first and second grooves respectively formed on the first and second housing portions.

7. The tool of claim 1, wherein the centerline of the groove is offset from the output longitudinal axis by a distance in a range of about 0.125 to 0.5 inches.

8. The tool of claim 7, wherein the distance is about 0.25 inches.

9. The tool of claim 1, wherein the groove includes first and second portions, the first portion is adapted to receive the index finger, and the second portion is proximal to a rear of the tool and has a curvature in a range of about 1.5 to 1.625 inches.

10. The tool of claim 9, wherein the curvature is about 1.52 inches.

11. The tool of claim 1, wherein the groove includes first and second portions, the first portion is adapted to receive the index finger, and the second portion is proximal to a rear of the tool and has a radius in a range of about 0.625 to 0.75 inches.

12. The tool of claim 11, wherein the radius is about 0.657 inches.

13. The tool of claim 9, wherein the second portion is adapted to receive a web between a thumb and the index finger of the user.

14. The tool of claim 1, wherein the groove follows a groove path having a curved portion and substantially straight portions, and the curved portion is proximal to a rear of the tool.

15. The tool of claim 14, wherein the substantially straight portions respectively extend from the curved portion at an angle of about 3° for a distance of about 3 inches.

16. The tool of claim 14, wherein the curved portion has a radius between a range of about 0.8125 to 0.875 inches.

17. The tool of claim 16, wherein the radius of the curved portion is about 0.825 inches.

18. The tool of claim 1, wherein the motor shaft is substantially axially aligned with the output longitudinal axis.

19. The tool of claim 1, further comprising a direction selector mechanism operably coupled to the motor housing portion substantially opposite the handle housing portion.

* * * * *